United States Patent [19]

Kikuchi et al.

[11] Patent Number: 4,704,002

[45] Date of Patent: Nov. 3, 1987

[54] DOT MATRIX DISPLAY PANEL WITH A THIN FILM TRANSISTOR AND METHOD OF MANUFACTURING SAME

[75] Inventors: Isako Kikuchi; Isao Ota, both of Osaka; Mamoru Takeda, Takatsuki; Seiji Kiyokawa, Nagasaki, all of Japan

[73] Assignee: Matsushita Electric Industrial Co., Ltd., Osaka, Japan

[21] Appl. No.: 946,609

[22] Filed: Dec. 29, 1986

Related U.S. Application Data

[63] Continuation of Ser. No. 502,685, Jun. 9, 1983.

[30] Foreign Application Priority Data

Jun. 15, 1982 [JP] Japan .................. 57-103204
Jul. 28, 1982 [JP] Japan .................. 57-132722
Jul. 28, 1982 [JP] Japan .................. 57-132723
Sep. 14, 1982 [JP] Japan .................. 57-159824

[51] Int. Cl.$^4$ ..................... G02F 1/13; H01L 29/78
[52] U.S. Cl. ..................................... 350/334; 357/23.7
[58] Field of Search ............. 350/333, 334; 357/23.7, 357/30 L

[56] References Cited

U.S. PATENT DOCUMENTS

| 3,824,003 | 7/1974 | Koda et al. ............... 350/334 X |
| 4,103,297 | 7/1978 | McGreivy et al. ............ 350/334 |
| 4,344,817 | 8/1982 | Chamberlin ............... 350/336 X |
| 4,385,292 | 5/1983 | Nonomura et al. ........... 350/334 |
| 4,386,352 | 5/1983 | Nonomura et al. ........... 350/333 X |

FOREIGN PATENT DOCUMENTS

2837433 3/1979 Fed. Rep. of Germany ...... 350/334

OTHER PUBLICATIONS

Lug et al, "A Low-Leakage-Current Thin-Film Transistor for Flat-Panel Displays", 1980 *Biennial Display Research Conference*, Oct. 1980, pp. 111–113.
Hayama et al, "Amorphous-Silicon Thin-Film Metal-Oxide Semiconductor, Transistors", *Appl. Phys. Lett.* 36(9), May. 1, 1980, pp. 754 & 755.
Brody et al, "A 6×6 Inch 20 Lines-Per-Inch Liquid Crystal Display Panel", *IEEE Transactions on Electron Devices*, Nov. 11, 1974, vol. ED-20, No. 11, pp. 995–1001.

*Primary Examiner*—Stanley D. Miller
*Assistant Examiner*—David Lewis
*Attorney, Agent, or Firm*—Wenderoth, Lind & Ponack

[57] ABSTRACT

A dot matrix display panel with a thin film transistor and the manufacturing method therefor, the panel being so constructed that a gate insulating layer and a semiconductor layer are provided as one laminated film substantially equal in the size thereto on an insulating substrate having a gate electrode and in a region of the substrate except for the peripheral portion thereof, and a source electrode and a drain electrode come into contact with the semiconductor layer in a region covering the gate electrode and gate insulating layer so as to constitute a thin film transistor array substrate, so that a display medium is sandwiched between the array substrate and the substrate having a transparent electrode.

6 Claims, 29 Drawing Figures

DOT MATRIX DISPLAY PANEL WITH A THIN FILM TRANSISTOR AND METHOD OF MANUFACTURING SAME

This application is a continuation, of now abandoned application Ser. No. 502,685 filed June 9, 1983.

BACKGROUND OF THE INVENTION

1. Field of the Invention

This invention relates to a dot matrix display panel used for a large-sized character or pattern display panel for a portable liquid crystal television or office automation system, and more particularly to a dot matrix display panel with a thin film transistor array and the manufacturing method for the panel.

2. Description of the Prior Art

Figure 1:
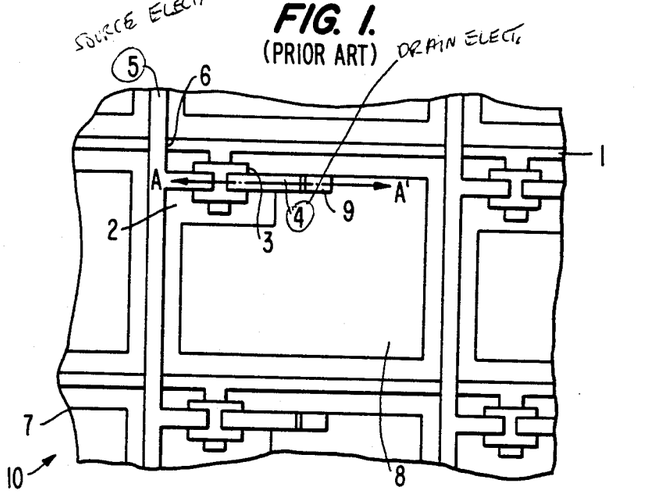
FIG. 1 is a plan view of a principal portion of a TFT array for a conventional matrix panel.

In order to display liquid crystal or the like in a matrix by a low duty factor, a switching element comprising a thin film transistor (to be hereinafter abbreviated to TFT) has hitherto been tried to be introduced into each picture element. In detail, a substrate 10 with a TFT array, as shown in FIG. 1 plan view and FIG. 2 sectional view on the line A-A', is constituted of a gate electrode 1, a gate insulating film 2, a semiconductor layer 3, a drain electrode 4, a source electrode 5 and a picture element electrode 8 connected to the drain electrode 4 through a contact hole 9, each at a picture element unit on an insulating substrate 7 such as glass. A display medium 12, such as a liquid crystal, as shown in FIG. 3 sectional view, is sandwiched between the substrate 10 with the TFT array and a transparent insulating substrate 14, such as glass, having thereon a transparent common electrode 13 such as indium oxide or tin oxide, whereby a X-Y matrix display panel capable of displaying a number of picture elements can be constituted.

Figure 2:
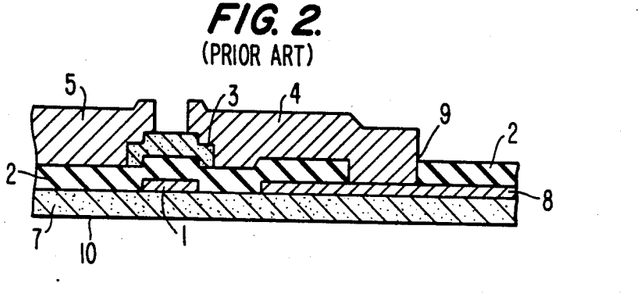
FIG. 2 is a sectional view taken on the line A-A' in FIG. 1.
Figure 3:
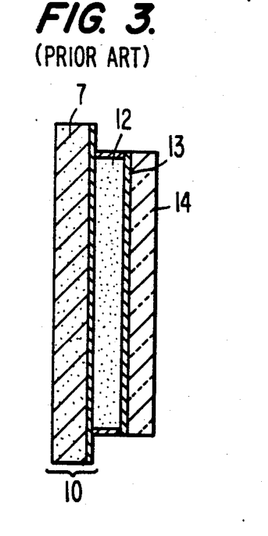
FIG. 3 is a sectional view of a conventional matrix display panel with a TFT array.
Figure 4:
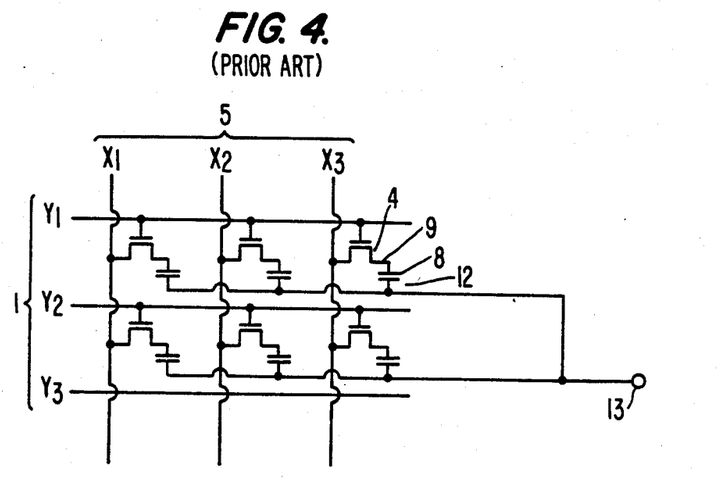
FIG. 4 is an electrical equivalent circuit diagram of the matrix display panel with the TFT array in FIG. 3.

Referring to FIG. 4, an electrical equivalent circuit of the matrix display panel with TFT array shown in FIGS. 1 to 3, is shown.

Next, explanation will be given on the principle of operation of the panel with reference to FIG. 4.

For convenience, the TFT is assumed to be of an n-channel enhancement type using CdSe or amorphous silicon as the semiconductor layer. In this case, in the state where a voltage is applied to make the drain electrode 4 positive with respect to the source electrode 5, when the gate electrode 1 is kept at a potential equal to or less than that of the source electrode 5, the TFT is off and a current scarcely flows between the source and the drain, but when the gate electrode 1 is kept positive with respect to the source electrode 5, electrons are induced within the semiconductor layer 3 in contact with the gate insulating film 2, resulting in the TFT being on so that a current flows between the source and the drain. For matrix-driving, signals are usually provided in the order of the line. In other words, at the time of simultaneously applying to signal lines $X_1, X_2, X_3 \ldots$ corresponding to the source electrodes 5 an on-signal (i.e.—a positive voltage with respect to that of the transparent common electrode 13) or an off-signal (i.e.—an equal or lower potential with respect to that of the electrode 13), a selection pulse (which is positive with respect to the transparent common electrode 13) is applied to one of scan electrodes $Y_1, Y_2 \ldots$ corresponding to the gate electrodes 1. The nonselected scan electrodes are kept at a nonselected potential (which is equal to or less than that of the transparent common electrode 13). Among the picture elements connected to the signal line to which the selection pulse is applied, the picture element supplied with the on-signal supplies a voltage to the display medium 12 because an electrical capacitor comprising the picture element electrode 8, transparent common electrode 13 and display medium 12 between the electrodes 9 and 13, is charged. On the contrary, the picture element supplied with the off-signal supplies no voltage to the display medium 12. In this way, the TFT element operates as a switch to prevent crosstalk. The charge disappears in accordance with a time constant depending on an off-resistance of the TFT, a resistance of the picture element and the capacitance of the picture element. For the display medium, such as a liquid crystal, which deteriorates during its life span unless driven by an AC voltage, a field sequential AC voltage must be supplied to the picture element.

In the aforesaid description, since the display panel mainly uses a twisted nematic liquid crystal as the display medium 12, when the picture element electrode 8 and the gate insulating film 2 or the semiconductor film 3 provided on the picture element electrode 8 are provided, these films 2 and 3 are restricted so as to be transparent. For example, in a case of using an amorphous silicon formed by the plasma CVD method, since the film is opaque, the process of removing the opaque semiconductor film on the picture element electrode 8 has been required. However, in a case where the gate insulating film 2 is of silicon nitride or silicon dioxide and the semiconductor layer 3 is of amorphous silicon or polysilicon, it is difficult to carry out the selective etching for removing the amorphous silicon or polysilicon semiconductor without damaging the gate insulating film 2 or the transparent picture element electrode 8, whereby strict control of the etching process has been required to obtain a thin film transistor having a superior performance. Even if the process is carefully controlled, it is actually difficult to produce the TFT array with a high yield.

When the TFT array in FIGS. 1 and 2 is manufactured by use of, for example, the plasma CVD method, the process comprising the following steps is necessary:

1. A step of forming a transparent electrode, such as tin oxide or indium oxide, on the glass substrate 7.

2. A step of using a first photomask to pattern the transparent electrode so that the transparent electrode is patterned by the photoetching into the form of the picture element electrode 8 in FIG. 1.

3. A step of forming a gate electrode material, such as chromium.

4. a step of using a second photomask to pattern the gate electrode material into the form of the gate and scan electrode 1 in FIG. 1.

5. A step of depositing the gate insulating film 2, such as silicon nitride or silicon dioxide, by use of the plasma CVD method.

6. A step of depositing an amorphous silicon semiconductor film by use of the plasma CVD method.

7. A step of using a third photomask to pattern the amorphous silicon semiconductor film in the vicinity of the picture element into the form as shown by reference 3 in FIG. 1 and to simultaneously etching-remove the amorphous silicon semiconductor film at the terminal pick-up portion at the peripheral portion of the display panel.

8. A step of using a fourth photomask to etching-remove the gate insulating film at the peripheral portion of the panel and the contact hole 9 in FIG. 1 between the drain electrode 4 and the picture element electrode 8.

9. A step of forming an electrode material for the source and drain electrodes 5 and 4.

10. A step of using a fifth photomask to pattern the electrode material into the form of the source electrode 5 and the drain electrode 4 in FIG. 1.

Thus, the transparent picture electrode 8 is covered by the transparent dielectric film for the gate insulating film 2 to constitute the TFT array. In a case where the dielectric film 2 is larger in thickness because it covers the picture element electrode 8, the film causes a voltage drop to raise the drive voltage, whereby the dielectric film 2 on the picture element should be etching-removed by the use of a sixth photomask. In the step 8, the simultaneous removal of the dielectric film 2 on the picture element has been considered, but, if the transparent electrode is exposed, the transparent picture element electrode 8, in the step 10, leads to its exposure to an aluminum etching liquid when using, for example, aluminum or the like as the material for the source and drain electrodes 5 and 4, thereby damaging the transparent picture element electrode 8. Hence, in the step 8, the gate insulating film 2 need remain on the picture element electrode 8, as the protective film therefor in the subsequent steps.

The abovementioned conventional TFT array formation process requires at least five to six photomasks so as to be troublesome, thereby having mainly caused the lowering of the yield and the raising of the manufacturing cost.

As seen from FIG. 1, the regions of the source electrode 5 and the gate electrode 1 cannot be displayed, but only the region of picture element electrode 8 except for the contact portion can substantially contribute to the display. In other words, the source electrode 5 and the gate electrode 1 significantly reduce the effective area of the picture element, and even when the density thereof is high, the FIG. 1 pattern is not similarly reducible, because the source and gate electrodes, when smaller in width, increase wiring resistances to easily cause distortion of signal waveform or a wire disconnection. This leads to a further lowering of the effective area thereof, thus having created a serious problem in that the construction of electrodes in FIG. 1, especially for a high resolution display, lowers the display quality so as to lead to a macroscopic lowering of contrast.

SUMMARY OF THE INVENTION

An object of the invention is to provide: a display panel with a TFT array, which is manufactured in a simplified process, provided with a number of picture elements, and of a high yield and a low manufacturing cost; and a manufacturing method for this display panel.

Another object of the invention is to provide a display panel with a TFT array and a manufacturing method for the panel, the display panel being manufactured in a simplified process, and having a high resolution, and a large number of picture elements.

Still another object of the invention is to provide a display panel with a TFT array and a manufacturing method for the panel, the display panel being manufactured in a simplified process, and having a high reliability and a large number of picture elements.

The inventors have paid attention to the fact that the step of minutely dividing a semiconductor layer or providing it at a minute portion will increase one step, and that, in this step, a variation in the element characteristic or lowering of yield is liable to occur. Accordingly, this invention has been made to use the semiconductor layer in a condition of continuous phase without minute-dividing the layer at all. Hence, this invention is directed to adoption of the method of applying a shielding mask only on a region for taking out an electrode terminal during the formation of an insulating layer or semiconductor layer to thereby prevent the insulating layer or semiconductor layer from being previously formed in the region, thus enabling the prevention of a film formation at a useless portion without increasing the number of steps in the process.

Also, the formation by the shielding mask makes the boundary of films smooth in the distribution of the film thickness, whereby the source and drain electrodes never traverse a steep stepped portion, resulting in the fact that even when the electrode film is made relatively small in thickness, there is no fear at all of disconnection. Furthermore, the gate insulating layer and semiconductor layer, in the subsequent process, are not at all patterned by the photoetching, thereby enabling the film to be kept uniform as it is grown, which is deemed to be contributive to an improvement in the yield.

In addition to the improvement of the yield, the number of steps in the process is reduced to enable the basic formation of the array by the use of only two or three masks, which is very advantageous in the manufacturing of the array and results in the low manufacturing cost of the panel. Also, a TFT channel portion or a semiconductor layer is protected so as to not directly contact the display medium, thereby being advantageous in that a TFT which is stable for a long time is obtainable. Furthermore, a number of insulating layers and semiconductor layers are formed on the gate and source electrodes which have hitherto been the display impossible areas, so that the electrical insulating property to the picture element electrode is maintained to make it possible to enlarge the same to an extent of overlapping with the gate and source electrodes, thereby being advantageous in that an effective area of each picture element has been significantly improved. Hence, this invention contributes to the provision of a display panel with a TFT array having a number of picture elements, of high reliability and high resolution.

These and other objects and features of the invention will become more apparent in the detailed description and examples which follow:

BRIEF DESCRIPTION OF THE DRAWINGS

FIGS. 5-(a) and -(b) are plan and sectional views of an embodiment of a display panel of the invention, showing a gate electrode having been formed in the manufacturing of the panel.

FIGS. 6-(a) and -(b) are plan and sectional views of a substrate for the TFT array, in which a gate insulating layer and a semiconductor layer have been deposited on the substrate shown in FIGS. 5-(a) and -(b).

FIGS. 7-(a) and -(b) are plan and sectional views of source and drain (picture element) electrodes after formed on the substrate shown in FIGS. 6-(a) and -(b).

FIGS. 9-(a) and -(b) are plan and sectional views, showing the drain electrode after being formed on the substrate shown in FIGS. 6-(a) and -(b).

FIGS. 10-(a) and -(b) are plan and sectional views, in which a source contact hole is provided on the substrate shown in FIGS. 9-(a) and -(b) after a layer-insulation layer is provided thereon.

FIGS. 11-(a) and -(b) are plan and sectional views of a source electrode layer which has been deposited on the substrate shown in FIGS. 10-(a) and -(b) and source-electric-like-patterned.

FIGS. 12-(a) and -(b) are plan and sectional views of still another embodiment of the invention, showing a substrate for the TFT array after the gate insulating layer, semiconductor layer and a protective insulating layer, of the invention are deposited on the substrate shown in FIG. 1.

FIGS. 13-(a) and -(b) are plan and sectional views of the substrate shown in FIGS. 12-(a) and -(b), on which the protective insulating layer has been patterned and the source and drain contact holes have been formed.

FIGS. 14-(a) and -(b) are plan and sectional views of the substrate shown in FIGS. 13-(a) and -(b), on which the source electrode and drain (picture element) electrode have been formed.

FIGS. 15-(a) and -(b) are plan and sectional views of the substrate shown in FIGS. 13-(a) and -(b), on which the source and drain electrodes have been formed.

FIGS. 16-(a) and -(b) are plan and sectional views of the substrate shown in FIGS. 15-(a) and -(b), on which a picture element contact hole is provided after the layer-insulation layer is provided, and FIGS. 17-(a) and -(b) are plan and sectional views of the substrate shown in FIGS. 16-(a) and -(b), on which the picture element electrode layer is provided and then picture-element-electrode-like-patterned.

DESCRIPTION OF THE PREFERRED EMBODIMENTS

An embodiment of a display panel of the invention will be described with reference to the drawings.

Figure 5A:
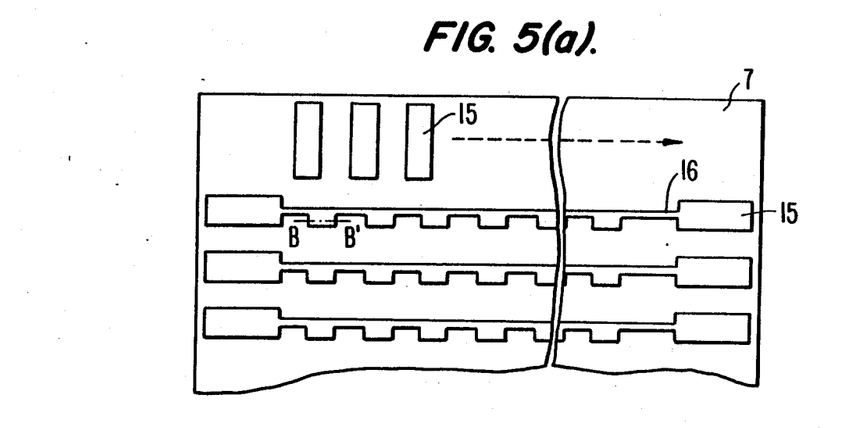
Figure 5B:
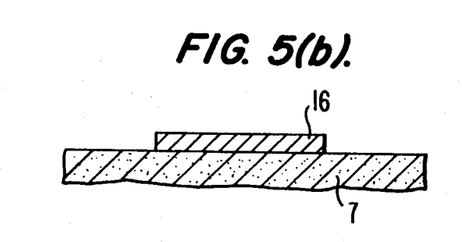
Figure 6A:
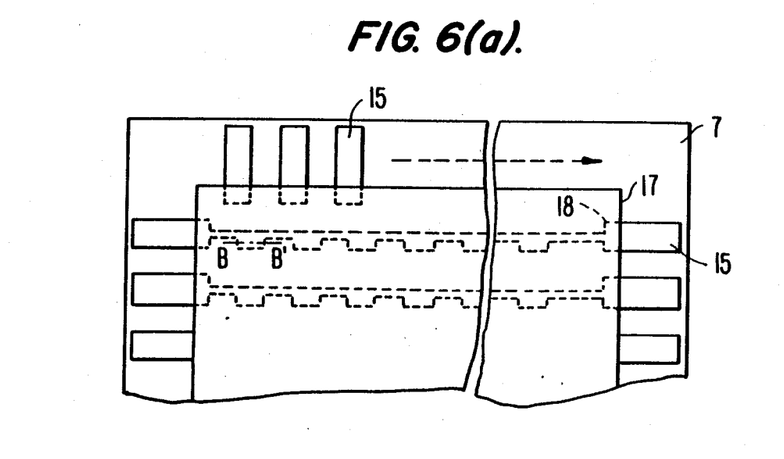
Figure 6B:
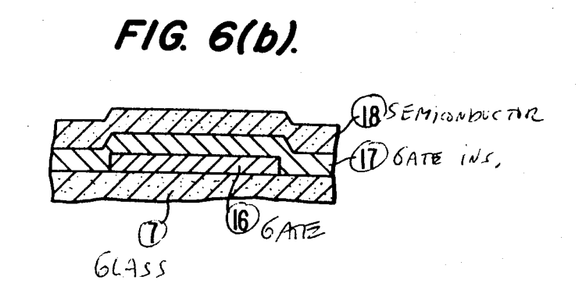
Figure 7A:
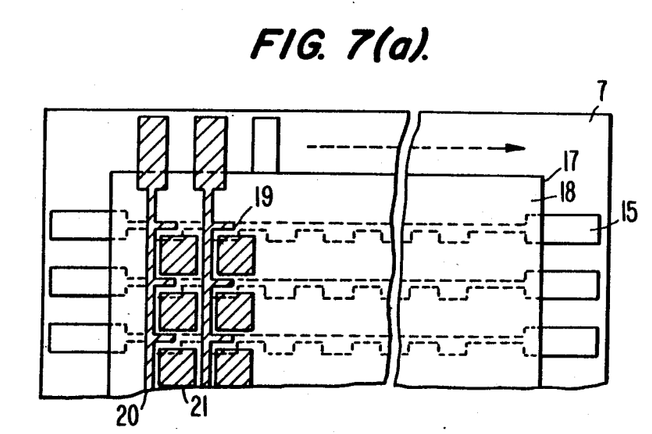
Figure 7B:
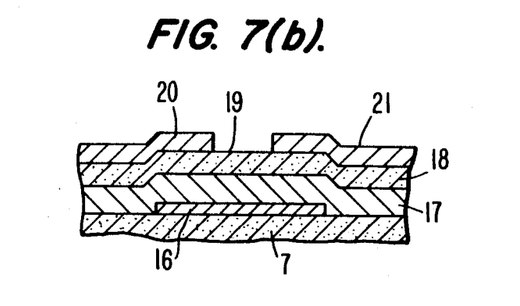

In a first embodiment of the present invention, after a gate electrode material, such as chromium, nichrome, molybdenum, and gold, is formed on an insulating substrate 7, such as glass, a first photomask is used to pattern the gate electrode material gate electrode 16 as shown in FIGS. 5-(a) and -(b) Next, in a case of producing an amorphous silicon TFT by the plasma CVD method, the substrate 7 is put into a plasma reactor, and a mixed gas mainly of silane gas is plasma-discharged to form a gate insulating film 17 of silicon nitride or silicon oxide or the like as shown in FIGS. 6-(a) and -(b). At this time, the plasma discharge is carried out in condition of bringing, for example, a metal mask into close contact with the peripheral portion of the substrate having the gate so that the film is not deposited at the terminal portions 15, thereby eliminating the subsequent process of removing the film. Next, the gas composition is changed to again perform plasma discharge of silane gas at the constituent so that an amorphous silicon semiconductor film 18 as shown in FIGS. 6-(a) and -(b) is deposited in the same form as the gate insulating film 17. The substrate 7 is taken out from the reactor, and the semiconductor film 18 is subjected to a surface treatment for improving the electrical contact of the source and drain electrodes with the semiconductor. Thereafter, on the overall surface of the substrate, a metal film to be the source electrode, and the drain or picture element electrode, is formed by vacuum evaporation or sputtering. As this metal film, a metal such as aluminum, chromium, nichrome and indium oxide is usable. The metal film, after being covered with a photoresist, is exposed to a light by use of a second photomask to pattern the photoresist into the form of at least a source electrode 20 and a picture element electrode 21 (used also as a drain electrode), and is then etched, thereby forming the source and drain (picture element) electrodes as shown in FIGS. 7-(a) and -(b) Next, the photoresist on the electrodes is removed.

Thus, in this invention, two photomasks are used to form a TFT array of the so-called inverted-staggered type, in which the gate electrode is positioned at the substrate side. In the conventional example as well as the method of the invention, the semiconductor of the TFT at a channel portion 19 is left exposed on one side, which later leads to a direct contact with the display medium, whereby some display medium may have an adverse effect on the TFT characteristics. In such a case, it is necessary to form a protective film on at least the region of the TFT, and, if necessary, on the source electrode 20 and picture element electrode 21 too.

The TFT manufacturing process of the invention has been described noted above on the basis of the plasma CVD method, in which if a different gate insulating film or a semiconductor film (such as cadmium selenide, or tellurium) formed by vacuum evaporation or sputtering used, the same construction as noted above can be obtained.

The construction of the matrix display panel obtained by the abovementioned method is different from the conventional TFT construction in that the picture element electrode 21 is placed on the semiconductor layer 18. Hence, when the semiconductor layer 18 has a high light absorption property, as amorphous silicon or polysilicon does, even if the picture element electrode 21 is a transparent electrode, such as indium oxide, a transparent type display apparatus is not obtainable. However, since silicon oxide, silicon nitride or alumina, used as the gate insulating film 17, is usually almost transparent if under 1 $\mu$ thick with respect to visible light, if a transparent film, such as cadmium selenide or cadmium sulfide, of several hundred Å is used as the semiconductor film 18, and a transparent electric-conductive film, such as tin oxide or indium oxide, is used for at least the picture element electrode 21, then the transparent type display panel, can be constituted by the method of the invention. In any case, the display panel can be formed by interposing the display medium between the transparent electrode 13 on the substrate 14 of glass or plastic and the TFT array constructed as noted above in the same way as shown in FIG. 3.

In this invention, various display media are usable. Especially when an opaque reflective electrode of aluminum is used as the picture element electrode, the following media are usable: a liquid crystal material of a nematic compound or a mixture of a nematic liquid crystal pigment is dissolved, used in the so-called guest-host mode; the so-called DSM mode liquid crystal comprising a nematic liquid crystal of negative dielectric anisotropy with some ionic dopant added, which is supplied with an electric field to form a light scattering nucleus to thereby make the liquid crystal cloudy; and the so-called phase transition liquid crystal which is a mixture of a nematic liquid crystal and a cholesteric liquid crystal, to which an electric field is supplied to generate a phase change between the nematic phase and the cholesteric phase to thereby realize a transparent or cloudy display. On the other hand, other than the liquid crystal, for example, the so-called electrophoretic dispersion, comprising an organic solvent colored by a dye and pigment particles different from the organic solvent in color and dispersed in the solvent, is usable. In this case, since the dispersion system is opaque, the transparent property and reflective property of the picture element electrode may not be considered.

Furthermore, it is possible to use an electrochromic type display medium, which supplies a voltage of a positive or negative polarity to the medium so that oxidization or reduction is generated between the electrodes and the display medium inserted therebetween to thereby reversibly realize a coloring or decoloring condition. This medium includes an inorganic phase of a $WO_3$ film and an organic phase of a viologen substance dissolved in a solvent, which are both applicable. In a case of using a liquid display medium, the TFT array substrate 10 and the substrate 14 with the transparent electrode 13 are attached at a minute spacing and the display medium 12 is injected into the panel through an inlet and then sealed.

The above is the passive type display medium, but an electroluminescence layer as an example of a luminous type display medium may be used. In other words, after the electroluminescence layer is formed by coating or vacuum evaporation on the overall surface of display area of the substrate having the picture element electrode or on the picture element electrode, the transparent electrode is formed to cover the picture element electrode, and the protective layer is formed, thereby obtaining a luminous type display panel with a TFT.

An improved construction of the invention, which further raises the performance of the TFT array, will be described below.

Figure 8:
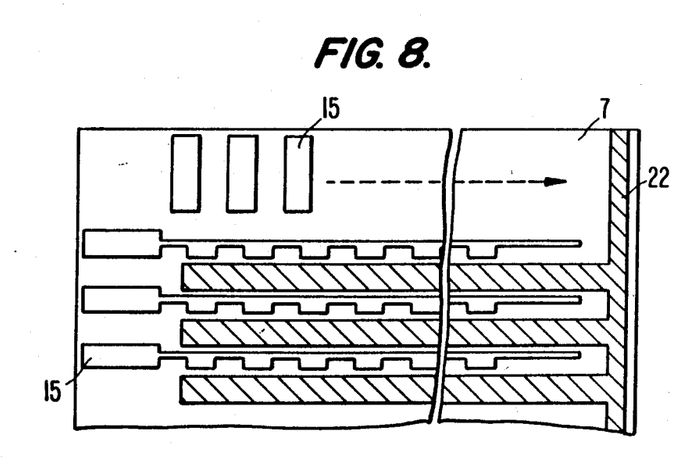
FIG. 8 is a plan view of a modified embodiment of a display panel of the invention, showing the substrate for the TFT array, on which panel the gate insulating layer and semiconductor layer are not yet deposited.

On the substrate 7, not only the gate electrode 16 is provided prior to formation of the gate insulating film 17, but also a parallel capacitance formation common electrode 22 is provided simultaneously with the formation of the gate electrode 16 as shown in FIG. 8. This is realizable merely by changing the pattern of the first photomask as shown in FIG. 8 without increasing the number of steps. The subsequent process to form the TFT array is quite the same as that described above with reference to FIGS. 6-(a) and -(b), 7-(a) and -(b).

The parallel capacitance formation common electrode 22 is connected electrically with the common transparent electrode 13 before or after insertion of the display medium 12, thereby completing the panel. In this case, the gate insulating layer 17 and the semiconductor layer 18 are interposed in a laminating manner between the parallel capacitance formation common electrode 22 and the picture element electrode 21 to thereby form a capacitor. Since the parallel capacitance formation common electrode 22 and the common transparent electrode 13 are connected electrically to each other, the capacitor formed at the panel is added electrically in parallel to the picture element capacitance formed by the common transparent electrode 13, the display medium 12 and the picture element electrode 21, and thus it is called the parallel capacitor.

The display panel with the TFT array with the parallel capacitor added is advantageous in that the TFT can be driven at a low voltage and has a low off-resistance and the display medium can have a low resistance.

Figure 9A:
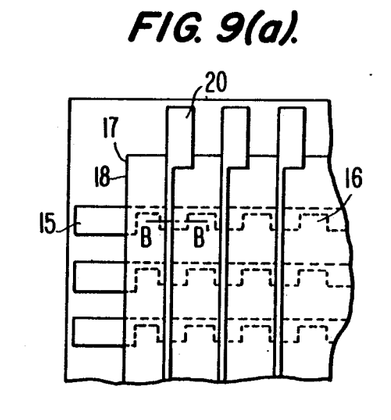
Figure 9B:
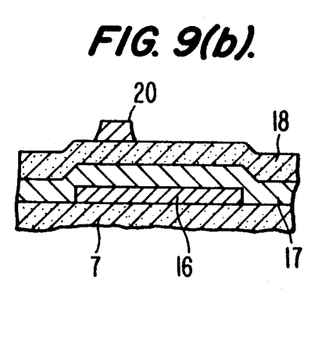

A second embodiment is fabricated such that a second electrode film, after the process in FIGS. 6-(a) and -(b) as described in the first embodiment, is provided on the overall surface of the substrate by vacuum evaporation or sputtering, and is patterned like the source electrode 20 by photo-etching as shown in FIGS. 9-(a) and -(b). Next, an organic insulating film such as a photoresist or polyimide, or an inorganic insulating film such as alumina, silicon dioxide and silicon nitride, by use of a vacuum evaporation, sputtering or CVD method, is provided as a layer insulating film 23 as shown in FIGS. 10-(a) and -(b).

Figure 10A:
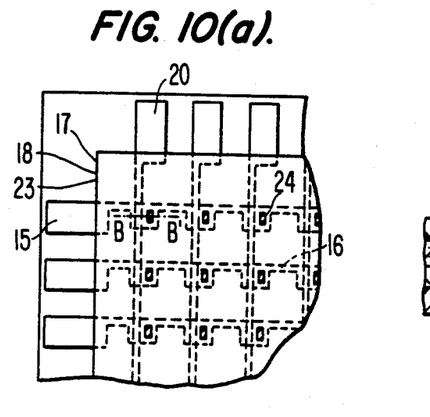
Figure 10B:
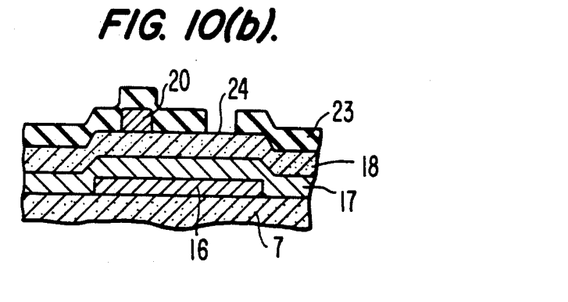
Figure 11A:
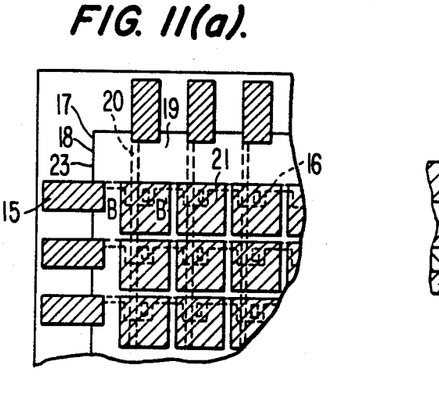
Figure 11B:
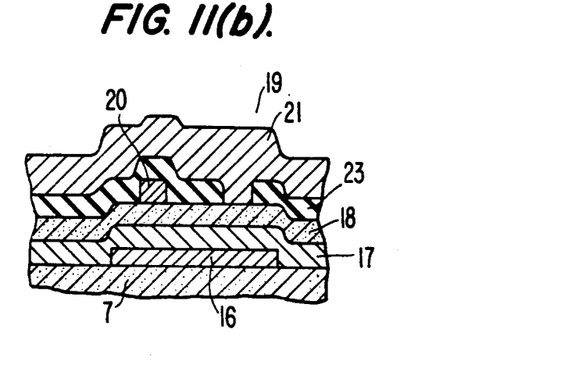
Figure 12A:
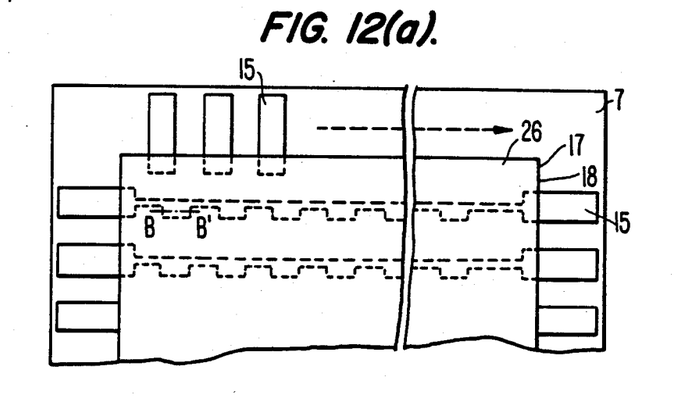
Figure 12B:
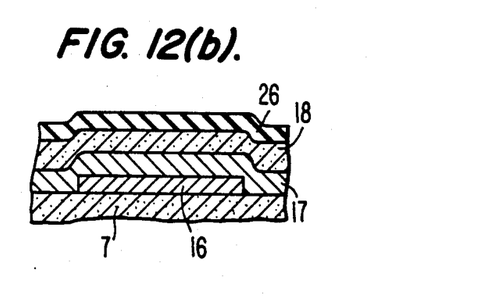

The layer insulating film 23, as shown in FIGS. 10-(a) and -(b), is provided, in the next step, with a contact hole 24 for a drain (picture element) electrode so that the surface of the semiconductor layer 18 is exposed at the contact hole 24. Next, a metal film to be the drain (picture element) electrode is formed substantially on the overall surface of the substrate by vacuum evaporation or sputtering. Then, a photoresist is coated on this metal film, and a photomask is used to expose the metal film to a light so that the metal film is patterned into the form of the drain electrode 21 as shown in FIGS. 11-(a) and -(b). Thereafter, the metal film is etched, thereby forming the drain electrode 21 used also as the picture element electrode. The metal film to be the picture element electrode is preferably allowed to also remain on the terminal 15 for reinforcement as shown in FIGS. 11-(a) and -(b).

The above construction isolates the source electrode 20 and the gate electrode 16 from each other through the gate insulating layer 17 and the semiconductor layer 18 to thereby keep the crossover insulation property. Also, the picture element electrode 21 and the source electrode 20 are isolated from each other through the layer insulating film 23, and the gate electrode 16 and the picture element electrode 21, except for the portion at the drain contact hole 24, are separated from each other through the layer insulating film 23, the semiconductor layer 18 and the gate insulating layer 17, thereby ensuring the electrical insulation property of the picture element electrode 21 from the other electrodes. In other words, the picture element electrode 21, which is different from the conventional example, greatly increases an effective area of the picture element because the picture element electrode 21 is overlapped with the source electrode 20 or the gate electrode 16 through the layer insulating film 23.

Since the layer insulating film 23 is provided on the channel regions (designated by 19 in FIGS. 11-(a) and -(b)) of the TFT, the semiconductor layer 18 is prevented from directly contacting the display medium 12, whereby the display panel of the invention has an advantage in that the TFT is kept stable for a long time.

A further important advantage of the invention is to ensure shading for the TFT channel portion 19. Generally, the semiconductor film 18, such as amorphous silicon or cadmium selenide, of the TFT exhibits a photo conductive effect, so that when the light strikes the TFT channel portion 19 or the ambient brightness varies, the characteristic of the TFT varies. In other words, usually the on-current and the off-current both increase to lead to a change of the brightness of the display panel, so that when the intensive light is projected to increase the off-current too much, a display may sometimes become impossible. The TFT of the invention is so constructed that the opaque picture element electrode 21 completely covers the TFT portion through the layer insulating layer 23, whereby there is no fear of projecting a light from the front to the TFT. If there is a fear of projecting a light from the rear, a shading layer may be provided on the overall rear surface of the substrate 7.

In a third embodiment of the present invention, a protective insulating layer 26 is formed on the semiconductor film 18 after the process as described in the first embodiment as shown in FIGS. 6-(a) and -(b). The protective insulating layer 26 may be made of any organic or inorganic material which is easily minutely etched by the subsequent etching, and has a high insulation property, and is not reactive to the display medium. For the organic material, a spinner coating is usually used and photoresist series materials or polyimide series materials are suitable. For the inorganic material, a dielectric film such as alumina, silicon dioxide and silicon nitride may be provided by a vacuum evaporation, sputtering or CVD method. In this case, the protective insulating layer 26, in the same way as the semiconductor film 18, may be deposited only at the central portion by using the mask on the peripheral portion to avoid deposits thereon, or the protective insulating layer 26 at the peripheral terminal portion may be removed by etching when it is etched later by the photoetching. In the next step, the protective insulating layer 26 on the substrate, as shown in FIGS. 13-(a) and -(b), is removed at the portion corresponding to the contact holes 25 and 24 for source and drain electrodes to expose the semiconductor layer 18 thereat and, if necessary, at the peripheral terminal portion simultaneously.

Figure 14A:
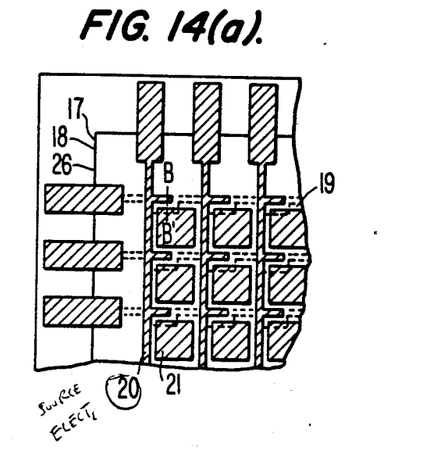
Figure 14B:
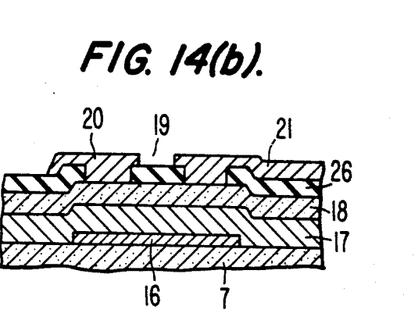

In the subsequent process, the semiconductor film 18 has a surface treatment applied in order to improve electrical contact with the source electrode and the drain electrode, and thereafter a metal film to be the source electrode and the drain or picture element electrode is formed on approximately the whole surface of the substrate by vacuum evaporation or sputtering. Next, after coating a photoresist on the metal film, a third photomask is used to expose the resist to a light to thereby pattern the resist into the form of the source electrode 20 and the picture element electrode 21 as shown in FIGS. 14-(a) and -(b), where the picture element electrode 21 also serves as the drain electrode, and the metal film is subjected to an etching after the resist is heated and hardened, thereby forming the source and drain (picture element) electrodes 20 and 21. Thereafter, the resist on the electrodes 20 and 21 is removed.

The aforesaid construction is largely advantageous in that a TFT which is stable for a long time is obtainable because the protective insulator layer 26 is provided on the channel region 19 of the TFT to thereby prevent the semiconductor layer 18 from direct contact with the display medium 12. Also, the area where the gate electrode 16 and the source electrode 20 intersect with each other, is partitioned by the gate insulating layer 17, the semiconductor layer 18 and the protective insulating layer 26, whereby the display panel has an advantage in that electrical insulation between the both electrodes is significantly improved. Furthermore, when a shielding mask is provided to form the films for the gate insulating layer 17, the semiconductor layer 18 and the protective insulating layer 26, the boundary of the films at the terminal portion distributes the film thickness in a gentle gradient, whereby the source electrode never traverses a steep stepped portion. Hence, in a case where at least the stepped portions at the contact holes 24 and 25 on the protective insulating layer 26 can be covered, even if the electrode film is relatively small in thickness, troubles such as disconnection do not occur at all. Also, since the gate insulating layer 17 and the semiconductor layer 18 are not at all patterned by the photoetching in the subsequent processes and the semiconductor layer 18 is provided with the protective insulating layer 26 so as to be prevented from contamination in the subsequent processes, the layers can be kept uniform as they are grown, thereby greatly contributing to an improvement in the yield. In addition, to the improvement in the yield, the number of steps in the process is reduced to enable the formation of the basic TFT array by use of at least three masks, which is very effective in the manufacturing of the TFT array and can contribute to significant lowering of the manufacturing cost of the display panel.

Figure 13A:
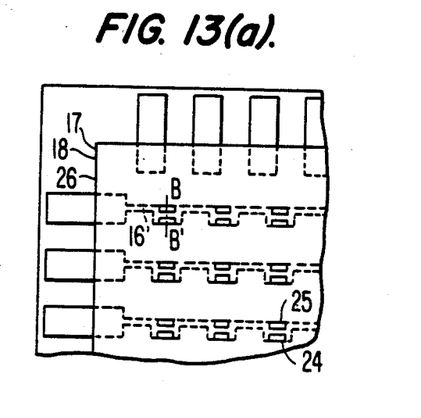
Figure 13B:
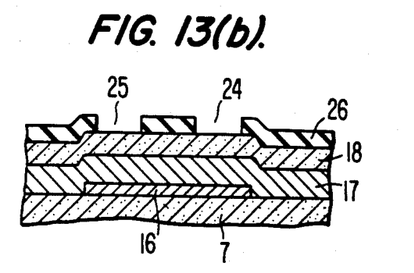
Figure 15A:
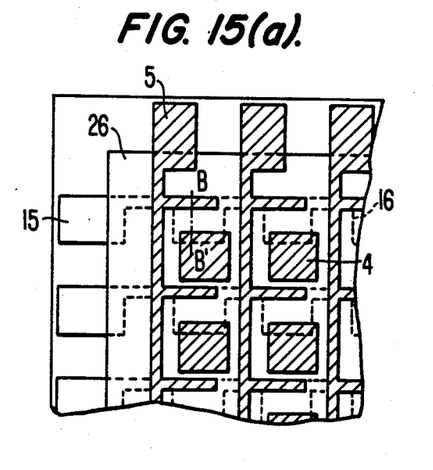
Figure 15B:
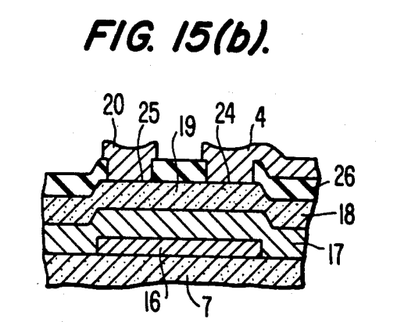
Figure 16A:
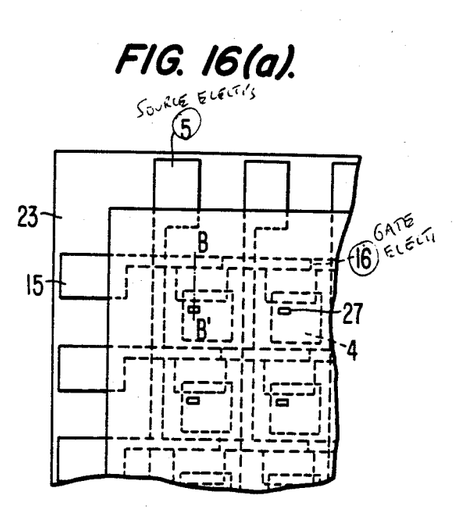
Figure 16B:
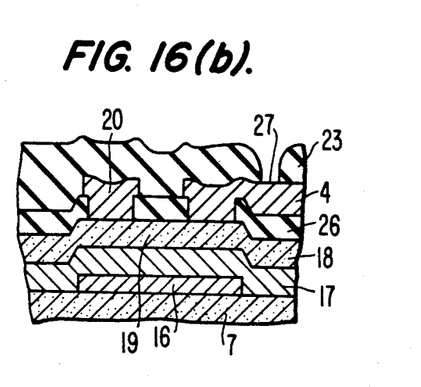
Figure 17A:
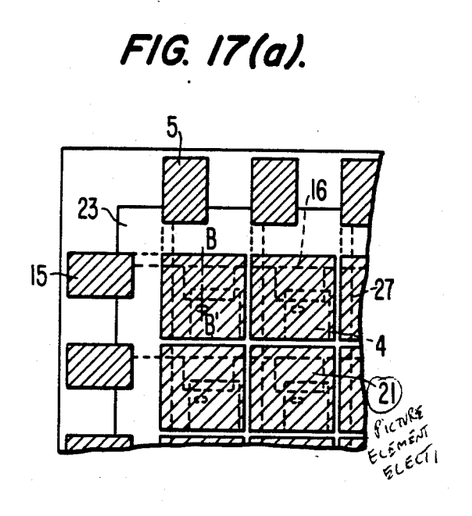
Figure 17B:
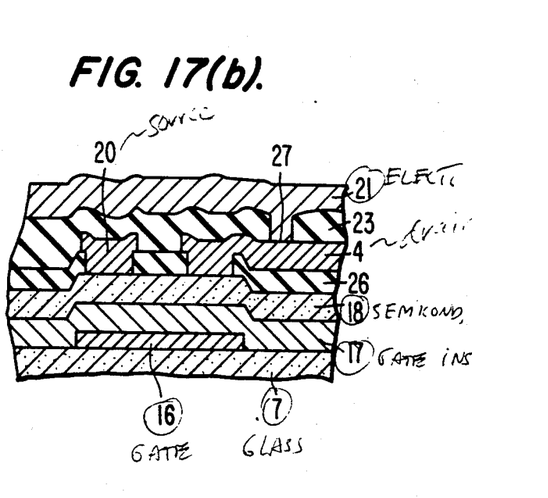

In a fourth embodiment of the present invention, a second electrode film, after the process described in the third embodiment in FIGS. 13-(a) and -(b), is provided approximately throughout the surface of the substrate 7 to thereby pattern the film into the form of the source electrode 20 and drain electrode 4 by means of photoetching as shown in FIGS. 15-(a) and -(b), and then a layer insulating layer 23 is provided as shown in FIGS. 16-(a) and -(b) in the same way as in FIGS. 11-(a) and -(b). The layer insulating film 23 is provided with a contact hole 27 for a picture element electrode. Next, a metal film to be the picture element electrode is formed by vacuum evaporation or sputtering on the approximately overall surface of the substrate 7 as shown in FIGS. 17-(a) and -(b) and then patterned into the form of the picture element electrode 21 by means of photoetching. The picture element electrode 21 is connected to the drain electrode 4 through the contact hole 27.

In the above construction, the source electrode 20 and the gate electrode 16 are isolated from each other through the gate insulating layer 17, the semiconductor layer 18 and the protective insulating layer 26 to thereby keep the crossover insulation property. The picture element electrode 21 and the source electrode 20 are isolated from each other through the layer insulating layer 23, and the gate electrode 16 and the picture element electrode 21 are isolated from each other through the gate insulating layer 17, the semiconductor layer 18, the protective insulating layer 26 and the layer insulating layer 23, whereby the picture element electrode 21 can be made larger than a conventional one to an extent that it overlaps with the source electrode 20 and the gate electrode 16. Hence, the display panel of the above construction can significantly improve the effective area of the picture element more than the conventional manufacturing method.

In the above-described embodiments, the parallel capacitance formation common electrode 22 in the first embodiment (FIG. 8) is applicable to the second through fourth embodiments.

While the conventional TFT array is formed by a semiconductor layer being provided throughout the panel surface and then divided by photoetching into minute portions, or a vacuum evaporation mask is used to form the semiconductor layer only on the minute portions, the inventors have noted that the method of dividing the semiconductor layer into minute portions or provided the same on the minute portions will increase the number of steps by one step, so that variations in the element characteristics and the lowering of the yield are apt to occur. Thus, this invention is directed to the construction in which the semiconductor layer is not at all divided into minute portions, but is made in continuous phases. Hence, in order to pick up the electrode terminal, the shielding mask, during the formation of the insulating layer and the semiconductor layer, is applied only to the region of the terminal not to previously form thereon these layers, thereby enabling the prevention of film formation unnecessary portions without increasing the manufacturing processes. Also, the shielding mask provided for film formation represents the distribution of film thickness at the boundary of the films or layers in the gentle slope and the source and drain electrodes never traverse any steep stepped portion to thereby cause no disconnection even with the electrodes being relatively small in thickness. Furthermore, in the subsequent processes, since the gate insulating layer and the semiconductor layer are patterned by photoetching, the layers are kept uniform as they are grown, thereby contributing to the improvement in the yield.

In addition to such an improvement in the yield, the number of steps in the process decreases to enable the formation of the basic TFT array with only two or three masks, which is very effective in the manufacturing of TFT array to largely reduce the manufacturing cost of the display panel. Also, the TFT channel portions and the semiconductor layers in the third and fourth embodiments are protected so as to not directly contact the display medium, thereby obtaining a TFT which is table for a long time. In the second and fourth embodiments, on the gate and source electrodes which have conventionally been the impossible display region, a number of insulating layers and a semiconductor layer are formed to thereby keep the electrical insulating property with respect to the picture element electrode. As a result, the picture element electrode can be made larger than a conventional one to an extent that it overlaps the gate and source electrodes, thereby being effective in improving an effective area of the picture element. Hence, this invention contributes to manufacturing of a display panel with a TFT array having a number of picture elements, and a high yield, and a low manufacturing cost, and a high reliability, and an excellent visibility.

Although several embodiments have been described, they are merely exemplary of the invention and not to be construed as limiting, the invention being defined solely by the appended claims.

What is claimed is:

1. A dot matrix display panel having a thin film transistor (TFT) array, comprising:
    an insulating substrate;
    a gate electrode formed on said insulating substrate;
    a gate insulating layer provided on said gate electrode and said insulating substrate except for a peripheral portion of said insulating substrate said peripheral portion being defined as that portion, of said substrate on which electrode terminals of said TFT array are disposed starting from the edges of said substrate,
    a semiconductor layer provided on said gate insulating layer having an area and in a shape which are both substantially the same as that of said gate insulating layer;
    a protective insulating layer provided on said semiconductor layer, said protective insulating layer being providing with contact holes at which said semiconductor layer is exposed;
    source and rain electrodes formed on said protective insulating layer so as to be respectively only partly in contact with said semiconductor layer through said contact holes so as to thereby form said TFT array, said drain electrode being formed so as to be a picture element electrode;
    a transport substrate having a transparent electrode formed thereon; and
    a display medium interposed between said insulating substrate having said TFT array formed thereon and said transparent substrate.

2. A dot matrix display panel according to claim 1, wherein said semiconductor layer comprises a material selected from the group consisting of amorphous silicon, polysilicon, cadmium selenide, and cadmium sulfide.

3. A dot matrix display panel according to claim 1, wherein said display medium comprises a member selected from the group consisting of liquid crystal, electrophoretic display suspension system, electrochromic layer, and electroluminescence layer.

4. A dot matrix display panel according to claim 1, further comprising a parallel capacitance formation electrode formed on said insulating substrate and electrically connected with said transparent electrode so as to constitute between said parallel capacitance formation electrode and said picture element electrode a capacitance which is parallel with a capacitance constituted between said transparent electrode and said picture element electrode.

5. A method of manufacturing a dot matrix display panel having a thin transistor (TFT) array, comprising the steps of:
    (1) forming a gate electrode material on an insulating substrate;
    (2) patterning said gate electrode material into a form of a gate electrode by using a first photomask;
    (3) providing a gate insulating layer on said gate electrode and said insulating substrate in a region except for a peripheral portion of said insulating substrate said peripheral portion being defined as that portion of said substrate on which electrode terminals of said TFT array are disposed starting from the edges of said substrate,
    (4) providing a semiconductor layer on said gate insulating layer so as to be of an area and so as to be in a shape which are both substantially the same as that of said gate insulating layer;
    (5) providing a protective insulating layer on said semiconductor layer;
    (6) providing contact holes on said protective insulating layer so that said semiconductor layer is exposed at said contact holes;
    (7) forming a metal film at least on said protective insulating layer and said contact holes so as to be only partly in contact with said semiconductor layer through said contact holes;
    (8) patterning said metal film into a form of a source electrode and a form of a drain electrode by using a second photomask so as to thereby form said TFT array; and
    (9) interposing a display medium between said insulating substrate having said TFT array formed thereon and a transparent substrate having a transparent electrode formed thereon so as to thereby form a display panel in which said drain electrode acts as a picture element electrode.

6. A method according to claim 5, wherein step (2) a parallel capacitance formation electrode is also formed together with said gate electrode by patterning said gate electrode material, and in step (9) said parallel capacitance formation electrode is electrically connected with said transparent electrode so as to constitute between said parallel capacitance formation electrode and said picture element electrode a capacitance which is parallel with a capacitance constituted between said transparent electrode and said picture element electrode.

* * * * *